(12) United States Patent
deLassus

(10) Patent No.: US 6,493,959 B2
(45) Date of Patent: Dec. 17, 2002

(54) TAPE PATH ADJUSTMENT TOOL

(75) Inventor: John F. deLassus, Louisville, CO (US)

(73) Assignee: Benchmark Tape Systems Corporation, Boulder, CO (US)

( * ) Notice: Subject to any disclaimer, the term of this patent is extended or adjusted under 35 U.S.C. 154(b) by 126 days.

(21) Appl. No.: 09/732,396

(22) Filed: Dec. 7, 2000

(65) Prior Publication Data

US 2002/0070305 A1 Jun. 13, 2002

(51) Int. Cl.[7] .............................................. G01B 1/00
(52) U.S. Cl. ............................ 33/549; 33/552; 33/645; 242/357
(58) Field of Search ........................... 242/357; 33/555, 33/549, 552, 613, 645, 502; 73/1.79

(56) References Cited

U.S. PATENT DOCUMENTS

| 3,046,665 A | * | 7/1962 | Nilsson | 33/549 |
| 3,345,857 A | * | 10/1967 | Shutes et al. | 33/502 |
| 4,914,827 A | * | 4/1990 | Cook | 33/549 |
| 4,916,824 A | * | 4/1990 | Shimazutsu et al. | 33/552 |
| 5,048,195 A | * | 9/1991 | Leonov | 33/613 |
| 5,426,861 A | * | 6/1995 | Shelton | 33/502 |
| 6,062,062 A | * | 5/2000 | Toida et al. | 33/502 |

\* cited by examiner

Primary Examiner—Christopher W. Fulton
(74) Attorney, Agent, or Firm—Patton Boggs LLP

(57) ABSTRACT

An automated adjustment system that permits an operator to quickly and accurately adjust the various adjustable components in a tape path. The adjustment system comprises an automated adjustment tool connected to a processing system. The automated adjustment tool comprises a plurality of probes connected to a nest fixture. The nest fixture is configured to receive a tape drive and securely position the tape drive for adjustment of the tape path. The plurality of probes are configured to individually engage the adjustable components in the tape path and provide a computer readable output to the processing system that indicates the vertical position of the individual components. The processing system is configured to receive the computer readable output, convert the computer readable output into a measurement and display the measurement on a display for an operator.

10 Claims, 7 Drawing Sheets

TAPE PATH ADJUSTMENT TOOL

FIELD OF THE INVENTION

The invention relates to digital tape drive storage devices, and in particular, to an adjustment system for quickly and accurately adjusting the vertical position of the various adjustable components in a tape path.

PROBLEM

Digital data is stored on tape drives utilizing a variety of designs, but in all cases, magnetic tape media is wound between a pair of tape reels as data is transferred to or from the tape media. In the art of data storage, the physical space required to store data is an important concern. To conserve space, tape drives often use a single reel tape cartridge design. The single reel tape cartridge design utilizes a supply reel located within the tape cartridge and a takeup reel located within the tape drive. After the tape cartridge is inserted into the tape drive, the tape media is connected to the takeup reel and wound through an internal tape path between the takeup reel and the supply reel as data is written and read from the tape media.

One example of the internal tape path includes a guide roller tape path located between the supply reel and the take up reel. The guide roller tape path comprises a plurality of guide rollers configured to guide the tape media as it is wound between the supply reel and the take up reel. A tape head located in the tape path reads and writes the digital data to and from the tape media as the tape media passes over the tape head. The digital data is written to and read from the tape media in rows, or tracks, running in a longitudinal direction relative to the tape media. To read or write data on a specific track, the tape head must align with the track as the tape media passes over the tape head.

Improvements in the art of magnetic tape media have allowed data to be written to and read from the tape media on continually narrower and more closely spaced tracks. To prevent errors in reading and writing data, the tape path traveled must be reproducible with a high degree of accuracy to accommodate these narrower tracks and maintain alignment of the tape head and tape track.

To achieve these tolerances in reproducibility the tape path must be precisely adjusted to prevent the tape media from moving unpredictably as it passes over the tape head. Thus, one of the final steps in tape drive production is adjustment of the vertical position of the various components in the tape path. In the case of a guide roller tape path, an operator uses a fixture to secure the tape drive with reference to a plane representing the adjustment height of the guide rollers and a plane representing the adjustment height of the takeup reel and a supply reel interface. The supply reel interface is configured to represent the vertical position of the supply reel contained in the tape cartridge when the tape cartridge is loaded into the tape drive. The fixture rests on a granite surface with the reference planes orientated parallel to the granite surface. The operator uses a tool referred to in the art as a height gauge, to individually adjust each guide roller, the takeup reel, and the supply reel interface to the appropriate height for tape drive operation.

Unfortunately, the adjustment process is time consuming and prone to both operator and equipment errors at different stages of adjustment. For example, a first source of error occurs when the height gauge is damaged resulting in an inaccurate measurement of the component heights. A second source of error occurs where the height gauge is misinterpreted or misread by the operator. The operator can also introduce a third source of error during re-calibration of the reference plane. Often the individual guide rollers are adjusted to different heights to accommodate various operations of the tape drive. In this case the reference plane must be re-calibrated before adjustment of the next guide roller. When these errors occur they are often not detected until final testing of the drive. Thus, all other drives adjusted during the interim period are questionable, and must be checked and possibly re-adjusted. Furthermore, since no record is kept of the adjustment process, auditing and re-adjustment is difficult to control.

Therefore a need exists in the art of tape drives for an improved tape path adjustment system that yields a more accurately adjusted tape drive with a higher degree of certainty.

Solution

The present invention overcomes the problems outlined above and advances the art by providing an automated adjustment system that allows an operator to quickly and accurately adjust the position of the various adjustable components in a tape path. The present adjustment system comprises an automated adjustment tool connected to a processing system. The automated adjustment tool comprises a plurality of probes connected to a nest fixture. The nest fixture is configured to receive a tape drive and securely position the tape drive for adjustment of the tape path. The plurality of probes are configured to individually engage the adjustable components in the tape path and provide a computer readable output to the processing system that indicates the vertical position of the individual components. The processing system is configured to receive the computer readable outputs, convert the computer readable outputs into measurements, and display the measurements on a display for an operator. The operator then uses the displayed measurements to adjust the individual components to a reference position that corresponds to the appropriate vertical position of each component.

In some examples of the present adjustment system, the processing system is configured to store the measurements for a plurality of tape drives adjusted using the adjustment system to provide an audit record of the tape drive adjustment process. In other examples of the adjustment system, a limit switch connected to the nest fixture is used to indicate tape drive loading status. Thus, if the tape drive is properly loaded, operation of the automated adjustment tool is permitted. If the tape drive is not properly loaded, operation of the automated adjustment tool is prevented. In still yet other examples of the adjustment system, the nest fixture also includes an adjustable stop that positions the tape drive in the horizontal direction so that the individual probes are aligned with a corresponding individual component in the tape path.

A first advantage of the present adjustment system is that it provides simultaneous measurements that indicate the present vertical positions of the various adjustable components in the tape path. A second advantage of the present adjustment system is that throughput of the adjustment process is significantly increased by the simultaneous measurement of the individual vertical positions. A third advantage of the present adjustment system is that it automates the current measurement and calibration of the reference plane for the various adjustable components of the tape path. A fourth advantage of the present adjustment system is that any probe position can be considered as the reference position so that if the desired height of an adjustable component changes, only the processor inputs need to be changed. The operator may still use the same reference position for adjustment, thereby reducing operator error. A fifth advantage of the present adjustment system is that it can accommodate a variety of tape drive designs for adjustment of a variety of tape paths. One skilled in the art can appreciate that this represents a significant advantage during tape drive design changes. A sixth advantage of the present adjustment system is the storage of the tape drive measurements to provide the audit record of the tape drive adjustment process.

DETAILED DESCRIPTION

For purposes of illustration and not of limitation, various features and advantages of the present adjustment system will now be described within the context of a single reel half-inch DLT tape drive. It is to be understood that the following description with respect to a DLT tape drive is not intended to limit the scope of the present invention. It would be obvious to one skilled in the art that the principles of the present invention could be easily applied to accommodate other tape drive formats The Tape Drive FIG. 1

Figure 1:
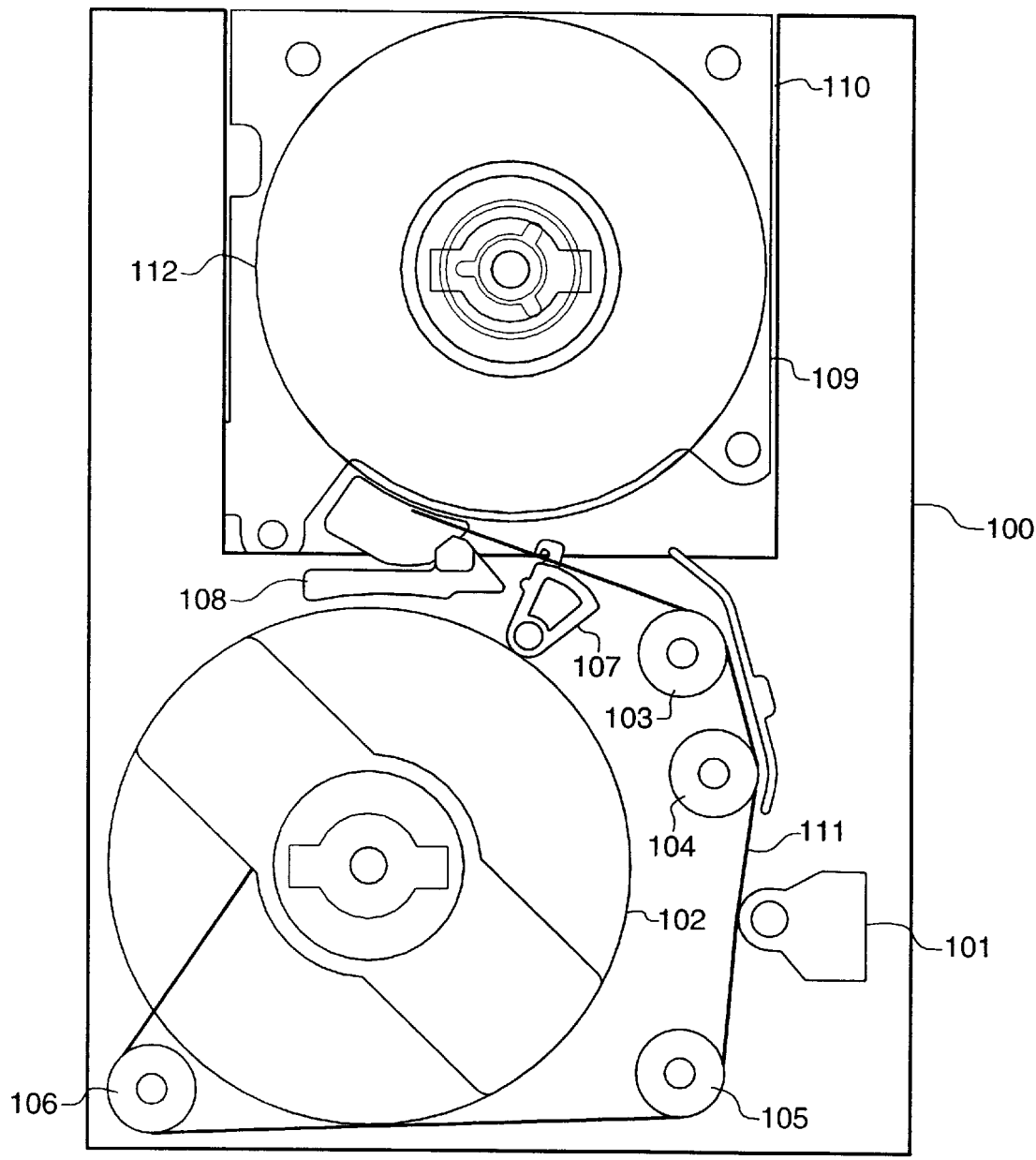
FIG. 1 illustrates an example of a tape drive and tape path accommodated by the adjustment system according to the present invention.

FIG. 1 illustrates a single reel tape drive 100. The tape drive 100 includes a tape head 101, a plurality of guide rollers 103–106, an internal takeup reel 102 and a loading assembly comprising a rotating catch 107 and a positioning lever 108. Magnetic tape media 111 is provided to the tape drive 100 by a tape cartridge 109 inserted into the tape cartridge receiver 110. The tape cartridge 109 includes a supply reel 112 that provides the magnetic tape media 111 to the tape drive 100. The rotating catch 107 and the positioning lever 108 connect the magnetic tape media 111 to the takeup reel 102 via a buckle between a tape cartridge leader terminating the magnetic tape media 111 and a takeup leader connected to the takeup reel 102. Subsequent to buckling of the tape cartridge leader and the takeup leader, the magnetic tape media 111 is wound past the tape head 101 through a tape path defined by the plurality of guide rollers 103–106, the takeup reel 102 and the supply reel 112 to a read position. Those skilled in the art will appreciate that the principles of the present invention could be easily applied to other tape path configurations and that the plurality of guide rollers 103–106, the takeup reel 102 and the supply reel 112 are one example of a tape path configuration that is used as an example and not as a limitation.

To prevent errors in reading and writing data and to prevent damage to the edge of the tape media 111, the tape path traveled must be reproducible with a high degree of accuracy to maintain a precise alignment of the tape head 101 with a specific tape track on the tape media 111. To achieve the reproducibility it is critical that the guide rollers 103–106, the takeup reel 102, and the supply reel 109 be precisely aligned by adjusting the various components to specific heights to prevent the tape media 111 from moving unpredictably as it passes over the tape head 101.

Figure 2:
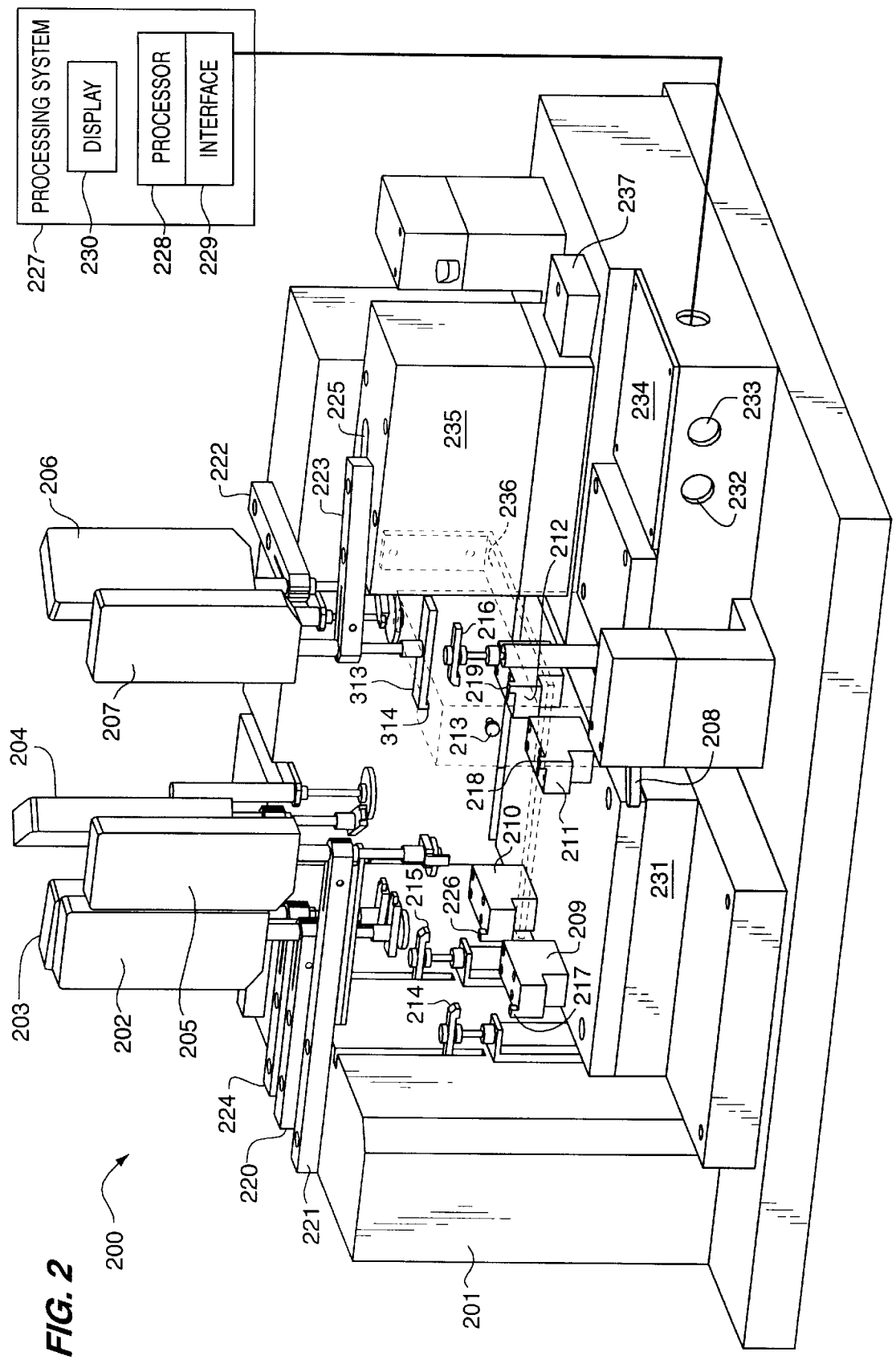
FIG. 2 illustrates an example of an adjustment system according to the present invention.
Figure 3:
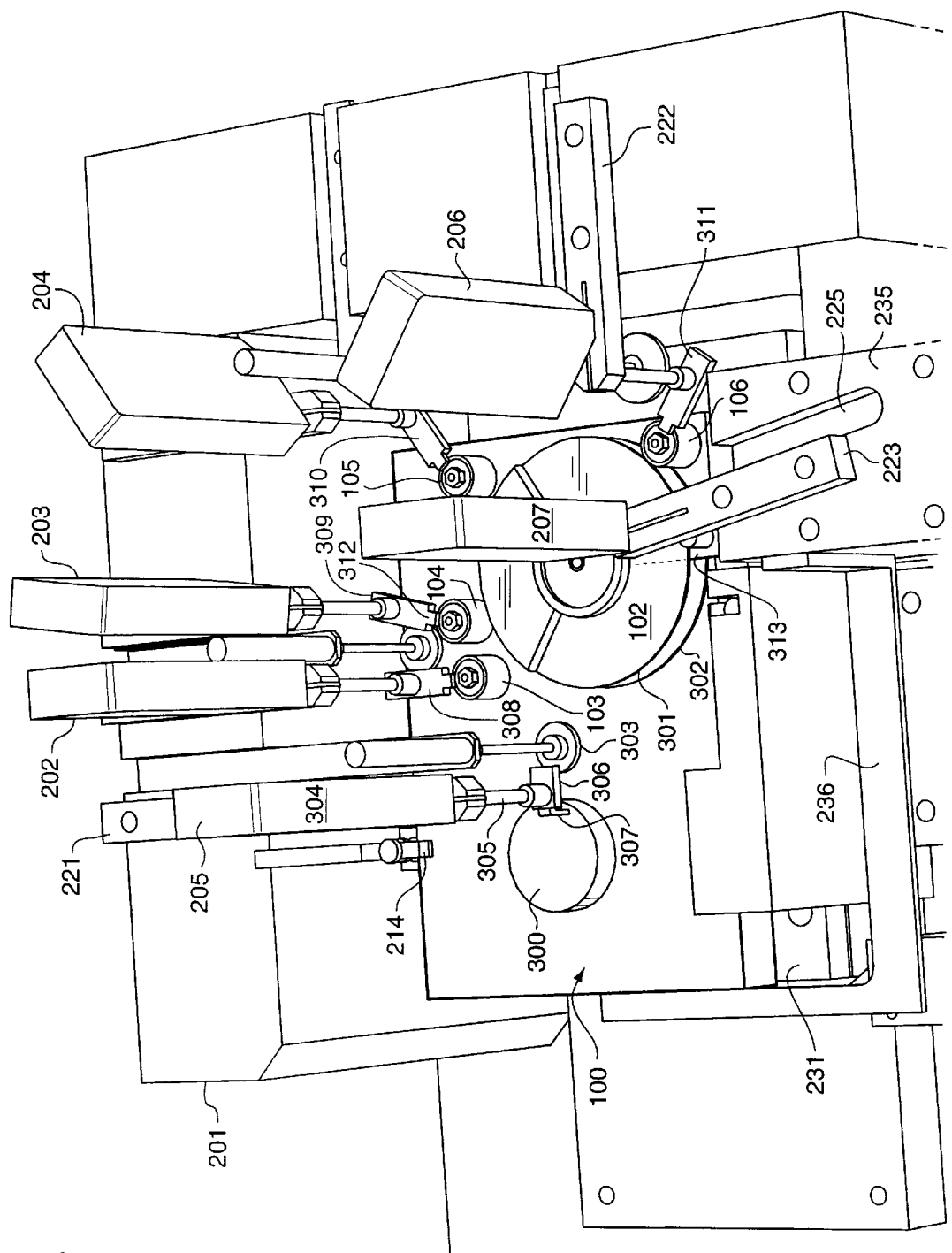
FIG. 3 illustrates a top perspective view of a tape drive loaded into an automated adjustment tool according to the present invention.
Figure 4:
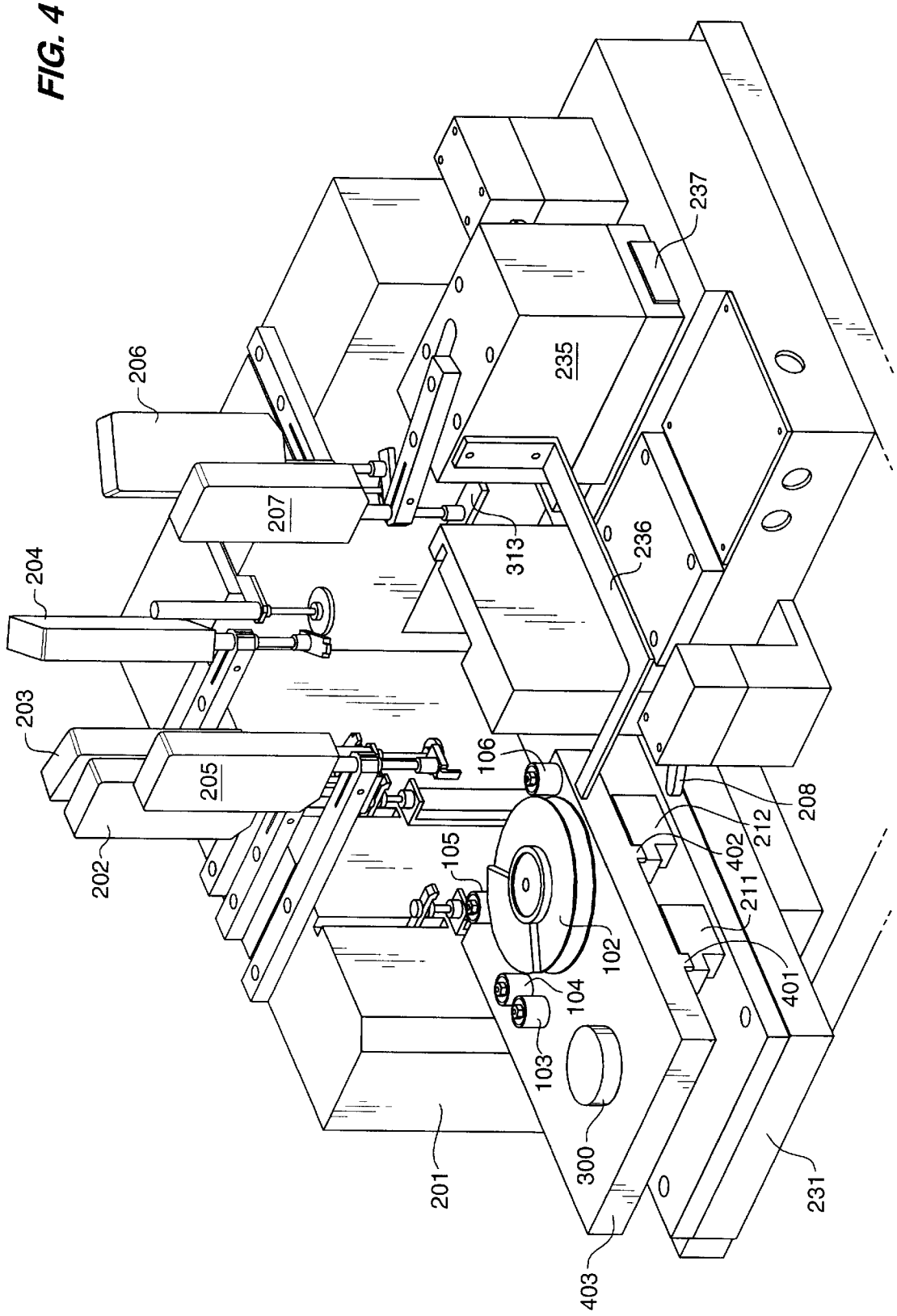
FIG. 4 is a perspective view illustrating the loading of a tape drive into the automated adjustment tool according to the present invention.

The Adjustment System FIGS. 2–4

Referring first to FIG. 2, there is shown an example of an adjustment system according to the present invention. The adjustment system is configured to permit an operator to accurately and precisely adjust the various adjustable components of a tape path. The adjustment system comprises an automated adjustment tool 200 connected to a processing system 227. The processing system 227 comprises a processor 228 coupled to an interface 229 and a display 230. The primary components of the automated adjustment tool 200 include, but are not limited to, a nest fixture 201, a plurality of probes 202–207, a base plate 231, mounting blocks 209–212, clamps 214–216, a limit switch 208, and an adjustable stop 213.

The adjustment system according to the present invention includes a probe, e.g. 206, for each component, e.g. guide roller 106, in the tape path that requires adjusting. The nest fixture 201, in combination with the mounting blocks 209–212 and clamps 214–216 is configured to receive, position, and secure the tape drive 100 for adjustment. The limit switch 208 provides feedback to the processing system 227 on the loading status of the tape drive 100 and limits operation of the automated adjustment tool 200 during loading of the tape drive 100 into the automated adjustment tool 200. The adjustable stop 213 is configured to position the base plate 231 so that the individual probes 202–207 are aligned with the individual adjustable components on the tape drive 100. As will become apparent from the following description, the automated adjustment tool 200 is calibrated using a calibration plate to provide reference positions to the processing system 227. The reference positions are used by the processing system 227 to provide feedback in the form of measurements to an operator on the vertical position of the adjustable components in the tape path. In the case of tape drive 100 these components include the guide rollers 103–106, the takeup reel 102 and a supply reel interface.

Operationally, the tape drive 100 is loaded onto the base plate 231 in the nest fixture 201. The probes 202–206 are lowered to engage the guide rollers 103–106 and a supply reel reference gauge 300, illustrated in FIG. 3. The supply reel reference gauge 300 is configured to represent the vertical position of the supply reel 112 when a tape cartridge 109 is loaded into the tape drive 100. As will become apparent from the following description, the supply reel probe 205 does not actually engage the supply reel 112, as the supply reel 112 is contained in the tape cartridge 109, but rather, engages the reference gauge 300, which is designed to replicate the supply reel 112. Additionally, the probe 207 is not only lowered, but is also slid into the takeup reel 102 to provide a reference with respect to the bottom inside surface of the takeup reel 102.

The probes 202–207 provide computer readable outputs to the processing system 227 on the vertical position of the guide rollers 103–106, the takeup reel 102, and through the use of the reference gauge 300, the supply reel 112. The processing system 227 converts the computer readable outputs into measurements, which are displayed on the display 230 for the operator. Using the measurements, the operator adjusts the vertical position of the guide rollers 103–106, the takeup reel 102 and the supply reel interface to a desired position to complete the adjustment process.

One skilled in the art will appreciate that additional probes, e.g. 202–207, could be added to the automated adjustment tool 200 as a matter of design choice to accommodate tape drive designs that include additional adjustable components. Similarly, the nest fixture 201 could be configured in different sizes to accommodate larger or smaller tape drive designs as a matter of design choice.

Referring also to FIG. 3, the plurality of probes, 202–206, are connected to the nest fixture 201 by arms 220, 221, 222, and 224. The arms 220, 221, 222, and 224, are fixably mounted to the nest fixture 201 so that the probes 202–206 are positioned to lower and engage the plurality of guide rollers 103–106 and the takeup reel 102. The arm 223 on the other hand, connected to probe 207, connects to the block 235 on the nest fixture 201 through a linear slide formed by groove 225. The linear slide permits the position of probe 207 to be adjusted to accommodate different tape drive form factors. Additionally, the block 235 slides in the horizontal direction on the block 237 in and out of the nest fixture 201 to position the probe 207 with respect to the takeup reel 102. Once positioned, the probe 207 references the bottom flange 301 of the takeup reel 102. Those skilled in the art will appreciate that because the spacing between the bottom flange 301 and the top flange 302 of the takeup reel 102 is tapered, the bottom flange 301 provides the optimal point of reference for the takeup reel 102. Those skilled in the art will also appreciate that while slightly more complicated, the taper between the bottom flange 301 and the top flange 302 could be taken into account so that the point of reference could be the top flange 302. In another example of the present automated adjustment tool 200, the arms 220, 221, 222, and 224 could also be slidably connected to the nest fixture 201, as exemplified by the connection of the arm 223 and probe 207. Advantageously, this permits the automated adjustment tool 200 to be easily reconfigured to accommodate different tape path designs and tape drive form factors, without reconfiguring the nest fixture 201.

The probe 205 comprises processing circuitry contained in a housing 304 and an elongated shaft 305 connected between the housing 304 and an engagement member 306. The engagement member 306 comprises an offset design so that only leg 307 contacts the supply reel gauge 300. This permits the supply reel gauge 300 to be adjusted without retracting the probe 205 so that a continual computer readable output is provided to the processing system 227 during the adjustment process. Advantageously, the continuous computer readable output during adjustment, permits the operator to quickly and precisely adjust the vertical position of the supply reel interface while referencing the measurement on the display 230. The probes 202, 203, 204, and 206 also comprise similarly housed processing circuitry and elongated members connected between the housings and a respective engagement member, e.g. 308, 309, 310, 311 and 313. The engagement members 308, 309, 310, 311 and 313 of the probes 202, 203, 204, and 206 also comprise an offset design so that only a tapered tip, e.g. 312, contacts the top plain of the guide rollers 103–106. Advantageously, the tapered tips, e.g. 312, of the engagement members 308, 309, 310, 311 and 313 also permit the guide rollers 103–106 to be adjusted without retracting the probes 202, 203, 204, and 206 so that a continual computer readable output is provided to the processing system 227 during adjustment.

The engagement member 313, (fully shown on FIG. 2), on the probe 207 also comprises an offset design so that only tip 314 contacts the top plain of the bottom flange 301 of the takeup reel 102. Those skilled in the art will appreciate that the engagement members, e.g. 306, could be configured in numerous different designs to accommodate different tape path components and configurations.

The probes 202–207 are clamped in the distal end of arms 220–224. The probes 202–207 are conventional plunger type probes, wherein the elongated shafts, e.g. 305, are raised and lowered from the housing 304. The housing, e.g. 304 of each probe 202–207 is fixed to a respective one of the arms 220–224. Plungers, e.g. 303, adjacent the probe 205 raise the elongated shaft 305, into the housing 304 of the probe 205 during loading of the tape drive 100. Similarly, the plunger 303 permits the elongated shaft 305 to lower and engage the supply reel reference gauge 300 subsequent to loading of the tape drive 100. Pneumatic air cylinders power the individual plungers, e.g. 303, to raise and lower the movable elongated shafts, e.g. 305, of the probes 202–206. The probe 207 on the other hand, is controlled manually so that the probe 207 can be lowered vertically and then moved horizontally into position between the flanges 301 and 302 of the takeup reel 102.

Referring also to FIG. 4, the base plate 231 is slidably connected to the nest fixture 201 to facilitate loading of the tape drive 100. Operationally, the base plate 231 slides out of the nest fixture 201 during loading, so that the tape drive 100 can be positioned on the mounting blocks 209–212. The mounting blocks 209–212 each include a perpendicular mounting post 217, 218, 219 and 226 (shown on FIG. 2) that is configured to mate with a corresponding feature on the underside of the tape deck 403. For example, the mounting posts 218 and 219 are configured to mate with ribs 401 and 402 on the underside of the tape deck 403. In some examples of the present automated adjustment tool 200, one of the mounting blocks 209–212 could be configured slightly lower than the other three mounting blocks to permit a three point, rather than four point, mounting of the tape drive 100. For example, mounting block, 209 could be five (5) mils lower than mounting blocks 210–212. Advantageously, the three point mounting of the tape drive 100 prevents distortion of the tape drive 100 during clamping of the tape drive 100 onto the base plate 231.

Operationally, the base plate 231 is slidably connected to the nest fixture 201 so that it may be moved in and out of the next fixture 201 to load the tape drive 100. The base plate 231 is permitted to move out of the next fixture 231 by sliding the block 235 out of the nest fixture 201 as illustrated by FIG. 4. Advantageously, sliding the block 235 out of the next fixture 201 disengages the probe 207 with respect to the bottom flange 301 of the takeup reel 102, as illustrated by FIGS. 3 and 4. Thus, as shown in FIG. 3 the probe 207 is moved between the bottom flange 301 and top flange 302 of the takeup reel 102 when the block 235 is inserted into the nest fixture. Similarly, as shown in FIG. 4, the probe 207 is disengaged from the takeup reel 102 when the block 235 is moved out of the nest fixture 201. The block 235 also moves a positioning gauge 236 to an out of the way position, illustrated by FIG. 4, to permit the base plate 231 to be moved out of the nest fixture 201. When the base plate 231 is inserted into the nest fixture 201, as illustrated by FIG. 3, the reference gauge 236 is positioned behind the tape deck 403. Advantageously, the reference gauge 236 provides a quick indication that the tape drive 100 is properly loaded on the base plate 231, and prevents removal of the tape drive 100 while the engagement member 313 is trapped inside of the takeup reel 102.

The amount the base plate 231 may be moved into the nest fixture 201 is controlled by the adjustable stop 213. The stop 213 is adjusted so that the base plate 231 is stopped when the adjustable components of the tape drive 100 are aligned with the probes 202–207. In some examples of the present automated adjustment tool 200, the adjustable stop 213 could include a threaded connection to the nest fixture 201 to permit adjustment in the horizontal direction, and control the inserted position of the base plate 231.

The clamps 214–216 are also controlled by the pneumatic air cylinders, and automatically lower to clamp the tape drive 100 onto the mounting blocks 209–212 once the base plate 231 is moved back into the nest fixture 201. The limit switch 208 controls the operation of the clamps 214–216. More specifically, when the base plate 231 is pulled out of the nest fixture 201, the limit switch 208 is triggered, as illustrated by FIG. 4. While the limit switch is triggered, operation of the pneumatic air cylinders is prevented to protect from premature lowering of the probes 202–206 and the clamps 214–216. When the tape drive 100 and the base plate 231 are re-inserted into the nest fixture 201, the limit switch 208 is released and operation of the pneumatic air cylinders are permitted to lower the probes 202–206 and the clamps 214–216.

In some examples of the present automated adjustment tool 200, the operation of the automated adjustment tool 200 could be controlled by the processing system 227. For example, inputs by an operator into the processing system 227 could control the raising and lowering of the probes 202–206, the ejection and insertion of the base plate 231 and block 235, and the operation of the clamps 214–216. In other examples of the present automated adjustment tool 200, operation of the automated adjustment tool 200 could be controlled by a control system 234. The control system 234 could be a conventional control system that receives inputs from an interface, such as buttons 232 and 233, to control the operation of the probes 202–206, the base plate 231 and block 235, and the clamps 214–216 as well as other operations that are described herein.

The processor 228 could be any device or group of devices configured to process the computer readable outputs from the probes 202–207 to convert the computer readable outputs into measurements and display the measurements on the display 230. The interface 229 could be any device or group of devices configured to receive the computer readable outputs from the probes 202–207 and provide the computer readable outputs to the processor 228. The display 230 could be any device or group of devices configured to receive the measurements from the processor 228 and display the measurements for an operator. One example of the processing system 227 including the processor 228, interface 229, and display 230 could be a conventional computer system.

Figure 5:
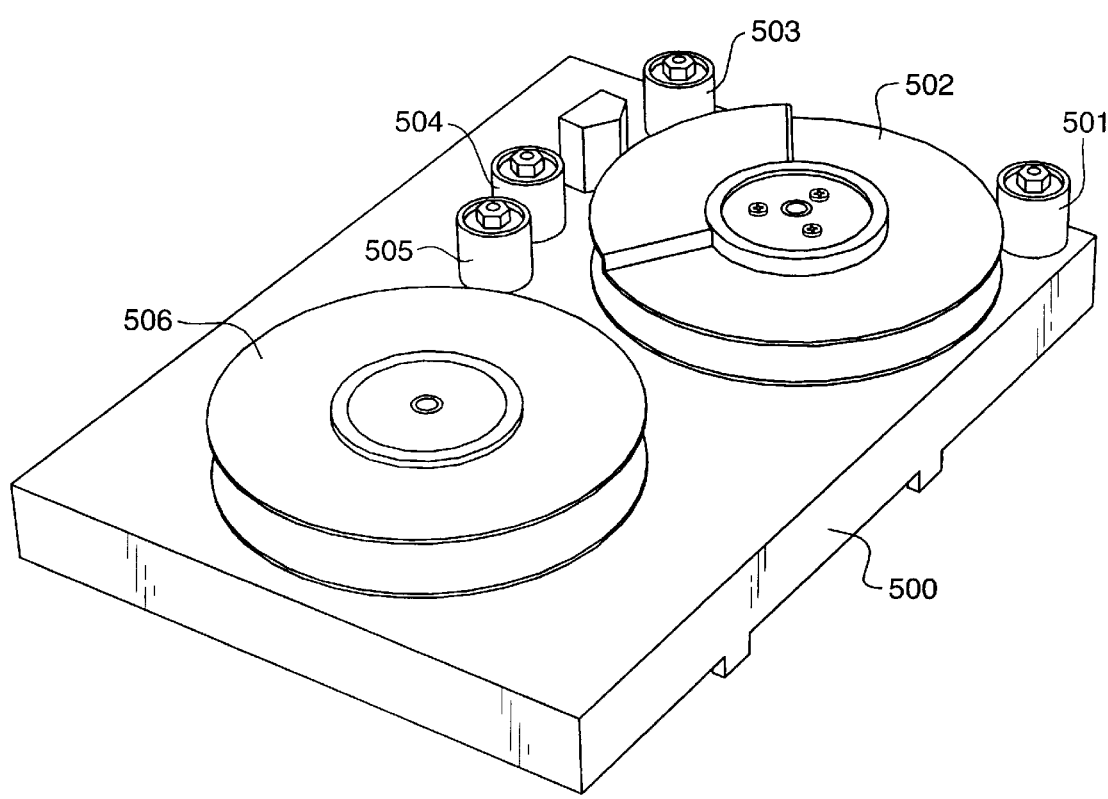
FIG. 5 illustrates an example of a calibration plate for the adjusting system according to the present invention.
Figure 6:
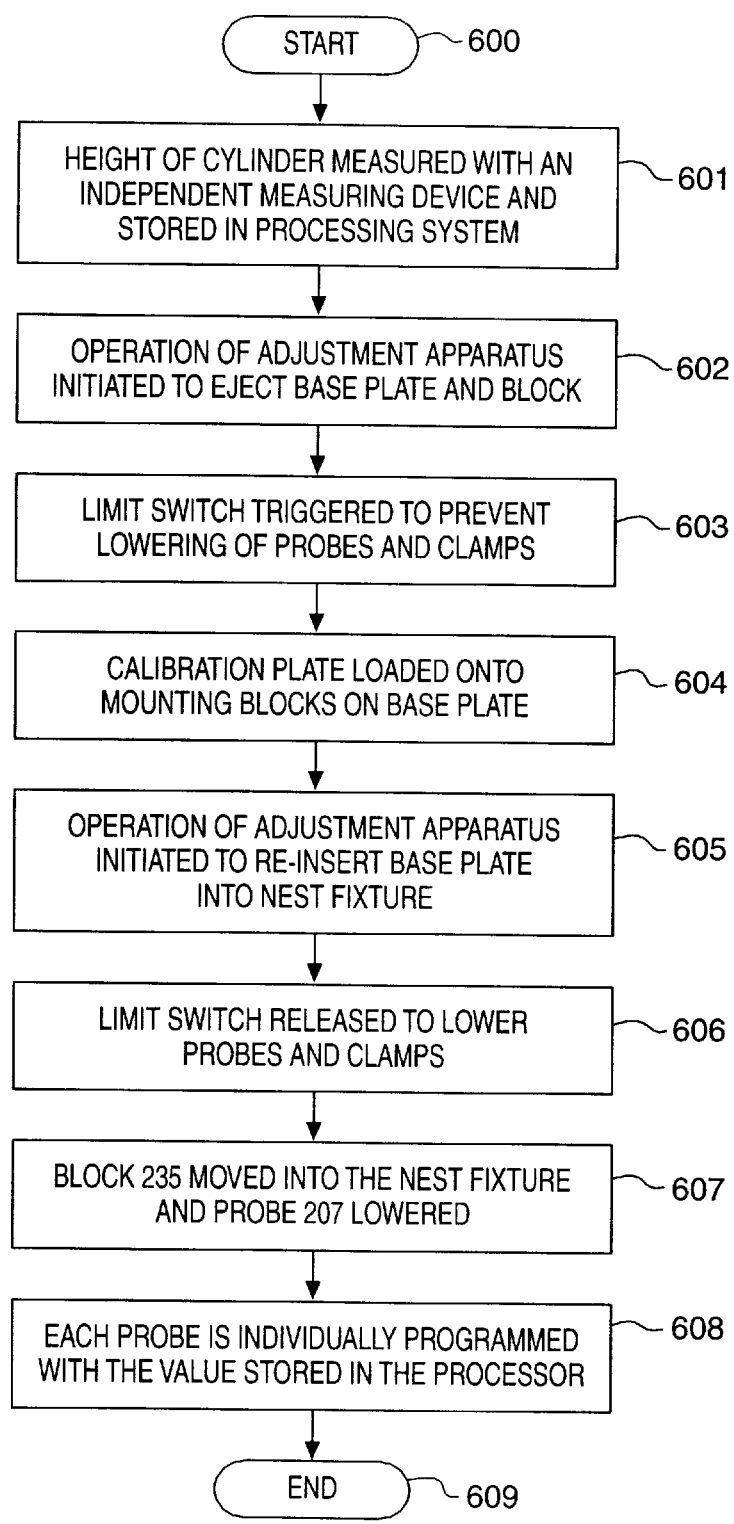
FIG. 6 is a flow chart illustrating the calibration steps of the adjusting system according to the present invention.
Figure 7:
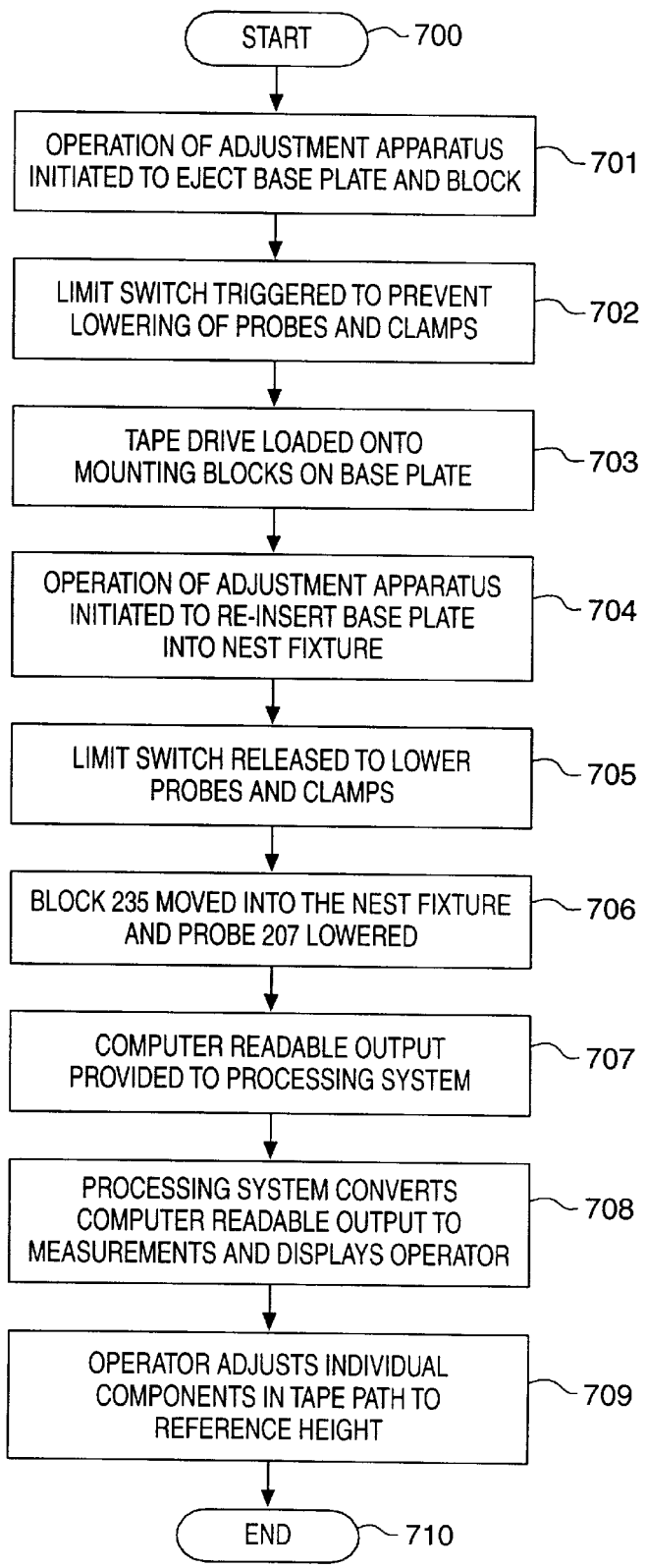
FIG. 7 is a flow chart illustrating the operational steps of an adjustment process using the adjustment system according to the present invention.

Calibration of the Adjustment System FIGS. 5–7

FIG. 5 illustrates an example of a calibration plate 500 according to the present invention. Probes 202–207 are linear encoders that have no reference position to the world until probes 202–207 are provided with a reference. The calibration of the automated adjustment tool 200 provides the reference position of the probes 202–207 to the processing system 227 using the calibration plate 500. The calibration plate 500 comprises cylinders 501–506 configured to replicate the position of the adjustable components in a tape path for the type of tape drive being adjusted.

FIG. 6 is a flow chart illustrating an example of a calibration method according to the present invention. On FIG. 6 the operation begins at step 600. At step 601 the height of each cylinder 501–506 is measured with an independent measuring device and the values are stored in the processor 228. At step 602, operation of the automated adjustment tool 200 is initiated at the control system 234 to move the block 235 and eject the slidable base plate 231. Alternatively, the ejection of the base plate 231 and block 235 could be a manual step, such as where an operator pulls the block 235 and the base plate 231 out of the nest fixture 201. In another example the ejection of the base plate 231 and the block 235 could also be controlled by the processing system 227. At step 603, the ejection of the base plate 231 triggers the limit switch 208, to prevent the lowering of the probes 202–206 and the clamps 214–216. At step 604 the calibration plate 500 is loaded onto the mounting blocks 209–212 on the base plate 231. At step 605, the operation of the automated adjustment tool is again initiated through the control system 234 or processing system 227 to slide the base plate 231 back into the nest fixture 201. At step 606 the limit switch 208 is released to automatically initiate operation of the pneumatic air cylinders and lower the probes 202–207 and the clamps 214–216. At step 607, the block 235 is moved into the nest fixture 201, which enables probe 207 to be lowered so that the probe 207 engages the bottom flange 301 of the takeup reel 102. Each of the probes 202–207 is lowered to a random position against the respective cylinders 501–506 that replicate the adjustable components of tape drive 100.

Probes 202–207 are divided into digital steps that represent the position of the individual probe. Thus, each one of probes 202–207 is lowered into a random position against a respective one of the cylinders 501–506 that mimic the adjustable components of a tape path. The random position itself is not important to the processing system 227. Rather, what is important is that the processing system 227 knows what the position represents. For example, if the actual measurement of cylinder 505 at step 601 of FIG. 6 is 0.89 inches, and when the probe 202 sits at this position, it happens to be at the 45th digital step, and each digital step of probe 202 represents 0.001 inches, then the processing system 227 is programmed to associate the $45^{th}$ digital step position of the probe 202 with a 0.89 inch vertical position of the cylinder 505. If the tape drive 100 is then placed into position on the automated adjustment tool 200, and the probe 202 is lowered to a digital step position of 40, then the processing system 227 recognizes that it is five (5) digital steps lower than the 0.89 inch position and is therefore at the 0.885 inch position. Each of probes 202–207 is independent and is similarly calibrated to the vertical position of the respective one of cylinders 501–506 by the same method. Thus, probe 202 could be at 0.89 inches at the $45^{th}$ digital step position while probe 203 is at 0.89 inches at the $67^{th}$ digital step position and any step position of the probes 202–207 can be compensated to a zero position for actual adjustment of a tape drive. Thus, at step 608 of FIG. 6, each of the probes 202–207 is individually programmed, as described above, with the values stored in the processor 228 so that all probes 202–207 have a true reference. The process ends at step 609.

Adjustment Operation FIG. 7

FIG. 7 is a flow chart illustrating the operation of the tape drive adjustment method according to the present invention. On FIG. 7 the operation begins at step 700. At step 701, operation of the automated adjustment tool 200 is initiated at the control system 234 to eject block 235 and the slidable base plate 231. At step 702, the ejection of the base plate 231 triggers the limit switch 208 to prevent the lowering of the probes 202–206 and the clamps 214–216. At step 703 the tape drive 100 is loaded onto the mounting blocks 209–212 on the base plate 231. At step 704, the operation of the automated adjustment tool is again initiated through the control system 234 or processing system 227 to slide the base plate 231 back into the nest fixture 201. At step 705 the limit switch 208 is released to automatically initiate operation of the pneumatic air cylinders and lower the probes 202–206 and the clamps 214–216. At step 706, the block 235 is moved into the nest fixture 201, which enables probe 207 to be lowered so that the probe 207 engages the bottom flange 301 of the takeup reel 102. At step 707, the computer readable outputs are provided to the processing system 227 from the probes 202–207. At step 708, the processing system 227 converts the computer readable outputs into measurements and displays the measurements for an operator. At step 709, the operator adjusts the individual adjustable components in the tape path to the reference height according to the displayed measurements, and the process ends at step 710.

The above-described processing systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. An automated adjustment tool for adjusting a tape path in a tape drive, the automated adjustment tool comprising:
    a nest fixture configured to receive the tape drive, position the tape drive for adjustment of the tape path and secure the tape drive in the position for adjustment of the tape path;
    a plurality of probes slidably connected to the nest fixture, wherein each individual probe comprising the plurality of probes is configured to engage an individual one of a plurality of components comprising the tape path and provide a computer readable output that indicates a vertical position of each of the individual one of the plurality components comprising the tape path; and
    a processing system coupled to the plurality of probes and configured to receive the computer readable output, convert the computer readable output into a measurement and display the measurement on a display for an operator, wherein the operator adjusts the vertical position of the plurality of components comprising the tape path according to the measurement displayed for the operator.

2. The automated adjustment tool of claim 1 wherein the nest fixture further comprises:
    a base plate slidably connected to the nest fixture and configured to slide into and out of the nest fixture during loading and unloading of the tape drive from the nest fixture; and
    a plurality of mounting blocks connected to the base plate and configured to mate with corresponding features on the tape drive to position the tape drive on the base plate for adjustment of the tape path.

3. The automated adjustment tool of claim 2 further comprising:
    an adjustable stop connected to the nest fixture and configured to position the base plate containing the tape drive so that the individual probes comprising the plurality of probes are aligned with a respective one of the individual one of the plurality components comprising the tape path.

4. The automated adjustment tool of claim 2 further comprising:
    a plurality of clamps connected to the nest fixture and configured to clamp the tape drive onto the mounting blocks.

5. The automated adjustment tool of claim 1 further comprising:
    a limit switch connected to the nest fixture and configured to indicate to the automated adjustment tool a loading status of the tape drive, wherein if the tape drive is properly loaded in the nest fixture the limit switch permits operation of the automated adjustment tool and if the tape drive is not properly loaded in the nest fixture the limit switch prevents operation of the automated adjustment tool.

6. The automated adjustment tool of claim 1 further comprising:
    a calibration plate configured to load into the nest fixture and provide a reference position for each of the individual one of the plurality components comprising the tape path.

7. A method for operating an automated adjustment system configured to adjust a tape path in a tape drive, the method comprising:
    loading the tape drive in a nest fixture;
    in response to loading the tape drive, lowering a plurality of probes so that each individual probe comprising the plurality of probes engages a respective one of a plurality of individual adjustable components comprising a tape path;
    automatically providing computer readable outputs from each individual probe comprising the plurality of probes that indicates a vertical position of the respective one of the plurality individual adjustable components comprising the tape path;
    receiving the computer readable outputs in a processing system;
    in the processing system, converting the computer readable outputs into measurements;
    displaying the measurements on a display for an operator; and
    adjusting the vertical position of the plurality of individual adjustable components comprising the tape path according to the displayed measurements.

8. The method of claim 7 wherein the step of loading the tape drive in the nest fixture further comprises:
    starting operation of the automated adjustment tool to automatically slide a base plate out of the nest fixture;
    positioning the tape drive on the base plate;
    starting operation of the automated adjustment tool to automatically slide the base plate into the nest fixture; and
    clamping the tape drive in the position for adjustment of the tape path.

9. The method of claim 8 further comprising:

automatically triggering a limit switch as the base plate is slid out of the nest fixture to prevent the plurality of probes from being lowered; and automatically triggering the limit switch as the base plate is moved into the nest fixture to automatically lower the plurality of probes so that each individual probe comprising the plurality of probes engages the respective one of the plurality individual adjustable components comprising a tape path.

10. The method of claim 7 the method further comprising:

storing the measurements for an individual tape drive to provide an audit record of a tape drive adjustment process.

* * * * *